Jan. 20, 1970  R. J. VIDAL ET AL  3,490,283
MOLECULAR SPEED RATIO PROBE
Filed May 8, 1967

INVENTOR
ROBERT J. VIDAL
JOHN A. BARTZ

BY

ATTORNEY

United States Patent Office 3,490,283
Patented Jan. 20, 1970

3,490,283
MOLECULAR SPEED RATIO PROBE
Robert J. Vidal, Clarence, and John A. Bartz, East Aurora, N.Y., assignors to Cornell Aeronautical Laboratory, Inc., Buffalo, N.Y., a corporation of New York
Filed May 8, 1967, Ser. No. 636,692
Int. Cl. G01f 1/00
U.S. Cl. 73—204     8 Claims

ABSTRACT OF THE DISCLOSURE

A probe having opposed flat plate heat transfer gages for measuring the average flat plate heat transfer rate from a low density gas stream to the probe and mounted substantially parallel to the direction of flow, a stagnation point heat transfer gage located at right angles to the direction of flow for measuring the stagnation point heat transfer rate from the gas stream to the probe, the molecular mean-free path of the gas is at least seven times greater than certain dimensions of the probe.

BACKGROUND OF THE INVENTION

Accurate measurements of the molecular speed ratio or Mach number of relatively low density gas flows has heretofore been extremely difficult, if not impossible. Such measurements are generally made at relatively low densities where the boundary layer about the measuring instrument or probe becomes quite thick. As a consequence, the inviscid flow about the instrument can be displaced and the measurements altered by the presence of the boundary layer. This situation is acceptable as long as the boundary layer displacement effects are known and a correction can be applied to the data. Unfortunately, at very low densities the probe boundary layer becomes a research problem in itself, and the necessary correction is not always possible.

Increasing interest has centered recently on the nonequilibrium processes that can occur in a gas when it is rapidly expanded in either a nozzle or a free-jet expansion. These effects are encountered when the particle transit time in the expansion is comparable with the molecular relaxation times, and the molecular processes are unable to reach an equilibrium. As a consequence, the isentropic relations used to describe a gas in equilibrium do not apply, and the molecular relaxation processes must be taken into account. Theoretical solutions for nonequilibrium flows are available, but, since these involve rate constants which are not well known, and in the case of air, involve complex coupling between the reactions, the validity of these solutions must be checked with experimental data. There is therefore a need for accurate instrumentation to acquire such empirical data.

SUMMARY OF THE INVENTION

The present invention relates to an apparatus for determining molecular speed ratio of Mach number, and more particularly to such an apparatus for determining the Mach number of relatively low density gases.

As will be discussed in greater detail infra, the apparatus according to the present invention circumvents the boundary layer problems present with prior instruments by the provision of a probe, the dimensions of which being such that the measurements can be interpreted with the theory for free molecular flows. To satisfy such theory the dimensions of the probe must be small in relation to the molecular mean-free path of the gas. As used herein the molecular mean-free path will be defined as the average distance a gas molecule travels before it collides with another gas molecule.

With the probe according to the present invention, the boundary layer is virtually nonexistent, since the molecules of gas that are re-emitted from the instrument after collision therewith do not interfere with incoming molecules of gas. Thus the instrument measures true conditions of the gas stream free from any distortions due to the presence of the instrument.

In addition to the ability to measure true stream Mach number, the present probe employs a self-calibration feature that enables accurate measurements without precise alignment with the direction of gas flow.

These and other advantages are achieved according to the present invention by the provision of a probe adapted to be placed in a gas stream, first means on the probe responsive to the flat plate heat transfer rate from the gas stream to the probe, second means on the probe responsive to the stagnation heat transfer rate from the gas stream to the probe and the dimensions of the probe being smaller than the molecular mean-free path of the gas stream.

BRIEF DESCRIPTION OF THE DRAWINGS

For a fuller understanding of the invention, reference should be had to the following detailed description of the same taken in conjunction with the accompanying drawing, wherein.

DESCRIPTION OF THE PREFERRED EMBODIMENT

Figure 1:
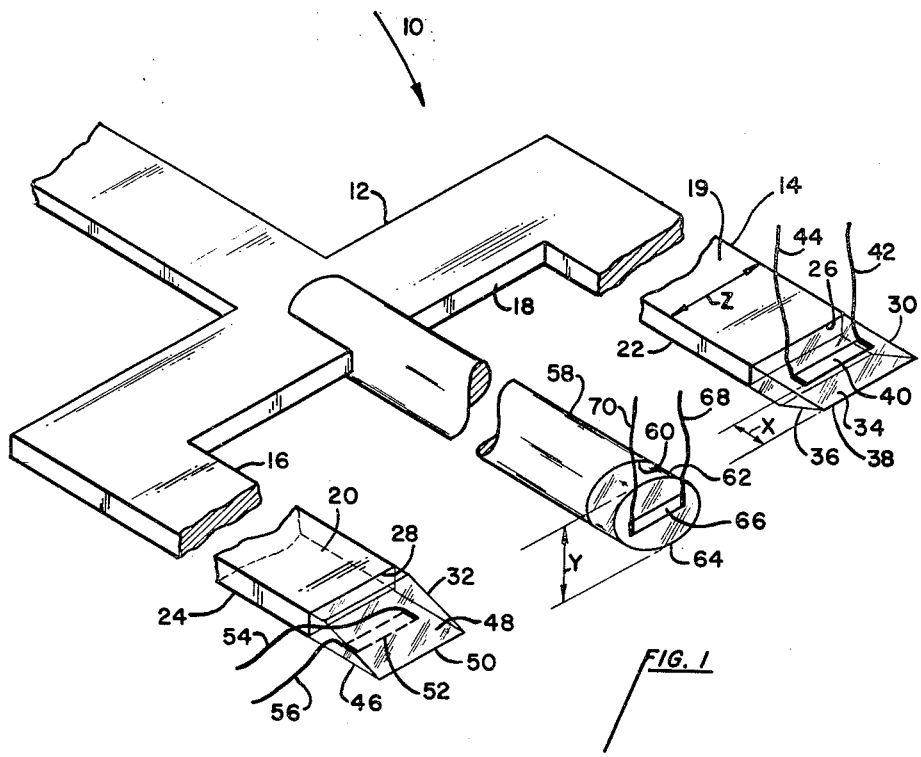
FIGURE 1 is a schematic pictorial representation of a preferred embodiment.

Referring now to the drawings, and more particularly to FIGURE 1, the probe according to the present invention is indicated generally at 10 and is shown as comprising a wafer-thin generally U-shaped metallic member 12, having two legs 14 and 16 and an interconnecting bight portion 18. Each leg 14, 16 has planar top faces 19, 20, respectively; planar bottom faces 22, 24, respectively; and extremely thin end faces 26, 28 (shown greatly enlarged for clarity).

Fixedly attached to each end face, 26, 28 are thermally insulating members 30, 32, respectively. Member 30 has a flat top surface 34 meeting an inclined bottom surface 36 defining a flow confronting edge 38 of negligible thickness. A heat responsive gage 40 is deposited on the flat top surface 34 of leg 14. Heat gage 40 may be a thin-film platinum thermometer the change in electrical resistance of which is proportional to the heat energy transferred therethrough, as is conventional; and may be deposited on surface 34 using conventional painting techniques, for example. Two lead wires 42 and 44 are attached to opposite ends of gage 40.

Member 32 is similar to member 30 except it has a flat bottom surface 46 that is opposite to top surface 34. An inclined top surface 48 meets bottom surface 46 defining therewith a flow confronting edge 50 of negligible thickness. Bottom surface 46 has mounted thereon a heat responsive gage 52 that is identical to gage 40 heretofore described, having two wires 54 and 56 leading from opposite ends thereof.

Members 30 and 32 may be fabricated of any suitable insulating material as Pyrex brand No. 7740, glass, for example.

A generally cylindrical middle leg 58 is fixedly mounted centrally of probe bight portion 18. Leg 58 terminates in a flat end face 60, upon which is mounted a thermally insulating cylindrical section 62 that may be fabricated of glass as members 30 and 32. Member 62 has a flat flow confronting end 64 that is perpendicular to flat surfaces 34 and 46. A heat responsive gage 66, similar to gages 40 and 52, is deposited on end 64 with wires 68 and 70 leading from opposite ends thereof.

Figure 2:
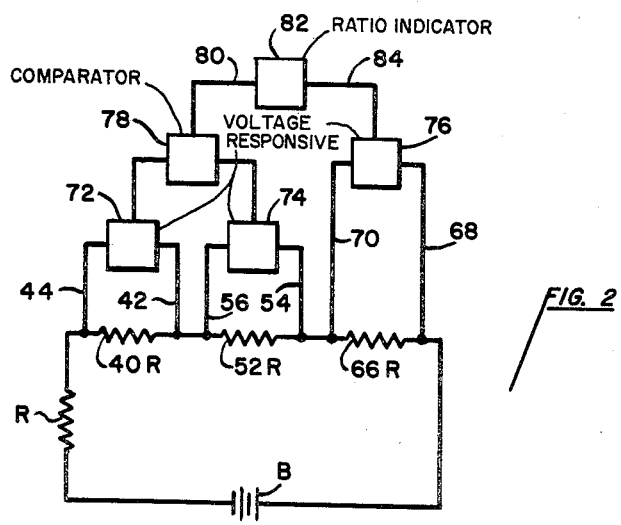
FIGURE 2 is a schematic circuit diagram of the electrical components employed with the probe of FIGURE 1.

Referring now to FIGURE 2, the heat responsive gages 40, 52, 66 are depicted severally as electrical resistances 40R, 52R and 66R, respectively; and are connected in series with each other. A source of voltage B and a resistor R complete the circuit. The resistor R is chosen to be about one hundred times larger than the highest expected sum of the resistances 40R, 52R and 66R of the heat gages, such that the current in the circuit is maintained essentially constant; consequently, the change in voltage drop across each heat gage will be directly proportional to the change in resistance thereof. Since the change in resistance of each of the heat gages is proportional to the heat sensed thereby from the flow to the probe, the change in voltage thereacross will be a measure of this heat transfer.

The lead wires 42 and 44 from gage 40; 54, and 56 from gage 52; and 68 and 70 from gage 66 are connected across suitable conventional voltage responsive members 72, 74 and 76, respectively.

A conventional voltage comparator or averager 78 is provided for developing a signal in line 80 that is proportional to the average of the voltages across gages 40 and 52 as determined by members 72 and 74.

Suitable conventional indicating and ratio means 82 are provided to indicate the ratio of the voltage from member 76 via line 84 to the voltage from member 78 via line 80. This ratio as will become apparent hereinbelow is a function of the Mach number of the gas stream impinging upon gages 40, 52, and 66.

In operation, the probe 10 is adapted to be placed in a low density gas stream with the flat surfaces 34 and 46 aligned generally parallel to the direction of flow and the end 64 generally perpendicular thereto.

The flat plate gages 40 and 56 respond to the heat transfer rate of the gas molecules impinging thereacross and in contact therewith, whereas the gage 66 responds to the stagnation point heat transfer rate of the flowing gas molecules impinging thereagainst. Free-molecule theory for a uniform flow shows that the flat plate and stagnation point heat transfer rates for small angles of attack and high Mach numbers (3 or greater) are $$q_{FP} = a_e \rho_\infty H_\infty \sqrt{\frac{RT_\infty}{2\pi}} \left[ 1 - \frac{\gamma+1}{2\gamma} \frac{H_w}{H_\infty} \right]$$

$$[1 + \sqrt{\pi}(\xi\alpha) + \ldots]$$

$$q_{ST} = a_e \rho_\infty U_\infty H_\infty \left[ 1 - \frac{\gamma+1}{2\gamma} \frac{H_w}{H_\infty} \right]$$

where:

$q_{FP}$ is the flat plate heat transfer rate per unit area,
$q_{ST}$ is the stagnation point heat transfer rate per unit area,
$A_e$ is the energy accommodation coefficient,
$\rho$ is the gas density,
H is the total gas enthalpy,
U is the gas velocity,
T is the gas temperature,
R is the gas constant,
$\xi = U/\sqrt{2RT}$, the molecule speed radio,
$\alpha$ is the inclination or angle of attach of the flat surfaces 34 and 46 with respect to the direction of flow,
$\gamma$ is the ratio of specific heats, and the subscripts $\infty$ and $w$ refer to ambient conditions in the gas and probe or wall conditions, respectively.

The derivations of Equations 1 and 2 together with a discussion of the theory can be found in "Fundamentals of Gas Dynamics" edited by H. Emmons, Princeton University Press (1958), pp. 687–737.

It can be seen that since the two flat surfaces 34 and 46 face in opposite directions, one will experience a positive angle of attack while the other will experience a negative angle of attack. The average of the heat transfer rate of these two flat surfaces, $\bar{\delta}_{FP}$, will then yield the heat transfer rate at zero angle of attack. Thus, adding Equation 1 with a positive $\alpha$ to Equation 1 with a negative $\alpha$ and dividing by two yields:

$$\bar{q}_{FP} = a_e \rho_\infty H_\infty \sqrt{\frac{RT_\infty}{2\pi}} \left[ 1 - \frac{\gamma+1}{2\gamma} \left( \frac{H_w}{H_\infty} \right) \right]$$

From Equation 3 it can be appreciated that the parallel but opposite facing instrumented surfaces 34 and 46 comprises a nulling arrangement whereby the effects of slight misalignment with the direction of flow are eliminated. This arrangement is extremely important, since experimentation has shown that a one degree misalignment causes a one hundred percent error in the final Mach number reading, where only one flat plate heat transfer gage was employed.

The ratio of stagnation heat transfer rate to the average flat plate heat transfer rate is obtained by dividing Equation 2 by Equation 3, which yields:

$$\frac{\delta_{ST}}{\delta_{FP}} = \frac{(a_e)_{ST}}{(a_e)_{FP}} \sqrt{4\pi} \xi$$

but since, the molecular speed ratio, $\xi$, by definition equals $$M \sqrt{\frac{\gamma}{2}}$$

where M is the Mach number of the gas flow, Equation 4 becomes, solving for M, $$M = \frac{(a_e)_{FP}}{(a_e)_{ST} \sqrt{2\pi\gamma}} \left( \frac{\delta_{ST}}{\delta_{FP}} \right)$$

Since the energy accommodation coefficients and the specific heat ratios are constants, the Mach number is directly proportional to the ratio of the stagnation point heat transfer to average flat plate heat transfer. With the apparatus according to the present invention, a signal is developed at 80 that is proportional to the flat plate average heat transfer rate, $\bar{\delta}_{FP}$, as sensed by gages 40 and 52, and a signal is developed at 84 that is proportional to the stagnation point heat transfer rate, $\delta_{ST}$, as sensed by gage 66. Indicator 82, suitably calibrated, may therefore indicate the Mach number of the gas directly.

It can be shown that Equation 5 is also obtained for a nonuniform stream, again provided that $\alpha$ is sufficiently small. As used herein, a nonuniform stream is defined as a one in which gardients exist in stream properties, such as density, temperature, and/or velocity.

In order to directly obtain results that are accurately indicative of the gas flow Mach number, it has been found that there must be a definite relationship between certain of the probe dimensions and the mean-free path of the gas flow. Such relationship is based on the requirement that the probe will not interfere with the free molecular flow pattern of the gas as would be the case where boundary layers are developed.

By experimentation, it has been determined that the ratio of the mean-free path of the gas to the diameter of end surface 64, and to the distance from edge 38 back to the gage must be seven or greater. In other words, if p is the mean-free path of the gas, then as shown in FIGURE 1, $$\frac{p}{X} \geq 7 \text{ and } \frac{p}{Y} \geq 7$$

In addition, the transverse dimension, Z, of leg 14 or 16 should be equal to or less than $4(x)$; whereas the longitudinal dimension of each of the gages should equal $x$.

As an illustration of the above requirements in practice in order to determine the Mach number of a vehicle moving in air at an altitude of 280,000 feet, where the mean-free path, p, is about 0.10 inch, dimension $x$ and $y$ would have to be about 0.01 inch and dimension $z$ could be about 0.04 inch.

In practice, probes according to the present invention have been produced with the following dimensions:

$x = 0.008$ inch
$y = 0.008$ inch
$z = 0.020$ inch

In addition to determining the Mach number of a gas stream moving relative to the probe or the Mach number of the probe moving relative to a gas stream as in reentry conditions, the angle of attack $\alpha$ can be determined by the difference between each of the flat plate readings divided by the stagnation heat transfer rate.

While a preferred embodiment has been described, modifications will occur to those skilled in the art to which this invention pertains, therefore it is intended that the invention is to be limited only by the scope of the appended claims.

What is claimed is:

1. In an apparatus for measuring the Mach number of a low density gas flow, comprising;
    (a) a probe adapted to be placed in a gas stream, having a first flat surface generally parallel to the flow of said gas stream and an end surface substantially perpendicular to said first flat surface,
    (b) first sensing means on said first flat surface responsive to the flat plate heat transfer rate between said gas stream and said flat surface,
    (c) second sensing means on said end surface responsive to the stagnation heat transfer rate between said gas stream and said end surface, and
    (d) means for developing a signal that is proportional to the ratio of the flat plate heat transfer rate as sensed by said first sensing means and the stagnation heat transfer rate as sensed by said first sensing means and the stagnation heat transfer rate as sensed by said second sensing means.

2. The apparatus according to claim 1, wherein;
    (e) said first sensing means is mounted on a top surface of said probe, and there is further provided,
    (f) third sensing means responsive to the flat plate heat transfer rate,
    (g) said third sensing means mounted on a bottom flat surface of said probe opposite to said top surface.

3. The apparatus according to claim 2 wherein;
    (h) said first, second, and third sensing means have surface dimensions, the ratio of the smallest surface dimension of each of said first, second and third sensing means to the mean-free path of the gas stream is at least one to seven.

4. The apparatus according to claim 3 wherein;
    (i) said top and bottom surfaces are parallel, planar surfaces, and
    (j) said end surface is perpendicular to said top and bottom surfaces.

5. The apparatus according to claim 4, wherein;
    (k) said means for developing a signal is also responsive to the average flat plate heat transfer rate as sensed by said first and third sensing means.

6. An apparatus for measuring the Mach number of a low density gas flow, comprising;
    (a) a probe adapted to be placed in a low density gas stream having two planar spaced legs and a spaced generally cylindrical middle leg,
    (b) each of said legs terminating in flow confronting edges,
    (c) flat plate heat transfer gages mounted, respectively, on a top and bottom surface of said planar legs and spaced from the edges thereof,
    (d) a stagnation heat transfer gage mounted on the edge of said middle leg,
    (e) the diameter of said middle leg and the distance from the edges of said planar legs to their respective gages each being substantially smaller than the mean-free path of the gas stream, and
    (f) means for developing a signal proportional to the ratio of the average flat plate heat transfer as sensed by said flat plate heat transfer gages to the stagnation heat transfer as sensed by said stagnation heat transfer gage.

7. The apparatus according to claim 6, wherein;
    (g) said diameter and distances are less than one-seventh the mean-free path of the gas stream.

8. The apparatus according to claim 7, wherein;
    (h) said gages comprise platinum thermometers and are mountd on glass portions of the proble.

References Cited

UNITED STATES PATENTS

| | | | |
|---|---|---|---|
| 2,536,037 | 1/1951 | Clousing et al. | 73—181 |
| 3,050,996 | 8/1962 | Henderson | 73—182 |
| 3,198,936 | 8/1965 | Flower. | 73—181 X |

RICHARD C. QUEISSER, Primary Examiner

JERRY W. MYRACLE, Assistant Examiner

U.S. Cl. X.R.

73—340